United States Patent
Shoji et al.

(10) Patent No.: US 7,297,973 B2
(45) Date of Patent: Nov. 20, 2007

(54) BREAST IMAGE OBTAINING METHOD AND APPARATUS

(75) Inventors: Takashi Shoji, Kaisei-machi (JP); Naoto Iwakiri, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/288,214

(22) Filed: Nov. 29, 2005

(65) Prior Publication Data
US 2006/0081795 A1    Apr. 20, 2006

Related U.S. Application Data

(62) Division of application No. 10/665,150, filed on Sep. 22, 2003.

(30) Foreign Application Priority Data
Sep. 20, 2002    (JP)    ............ 2002-275263

(51) Int. Cl.
    *G03B 42/08*    (2006.01)
(52) U.S. Cl. ............ 250/584; 250/581; 250/582; 250/583; 250/591
(58) Field of Classification Search ........... 250/584, 250/581, 582, 583, 591
    See application file for complete search history.

(56) References Cited

U.S. PATENT DOCUMENTS 4,258,264 A    3/1981    Kotera et al.
4,706,129 A *  11/1987   Yamada .............. 358/494
4,721,856 A *  1/1988    Saotome et al. ........ 250/583
6,268,614 B1   7/2001    Imai
6,444,997 B2 * 9/2002    Isoda ................ 250/587

FOREIGN PATENT DOCUMENTS

JP    56-011395 A    2/1981
JP    2000-284056 A  10/2000

* cited by examiner

*Primary Examiner*—David Porta
*Assistant Examiner*—Shun Lee
(74) *Attorney, Agent, or Firm*—Sughrue Mion Pllc.

(57) ABSTRACT

A breast image obtaining apparatus using a solid-sate detector, or stimulable phosphor panel capable of correctly obtaining image information up to the area closer to the chest wall of a subject. when picking up the image, the solid-state detector is moved to a place close to the side wall of the housing on the chest wall side by the moving means to pick up the image up to the area close to the chest wall, and when reading the image, it is moved to the opposite direction to secure the overrun zone between the side wall of the housing and end of the solid-state detector on the subject side. By completing acceleration or deceleration of the reading light exposure section within this zone, the scanning rate of the reading light exposure section is maintained constant across the entire region of the solid-state detector.

8 Claims, 8 Drawing Sheets

SUB-SCANNING DIRECTIONS

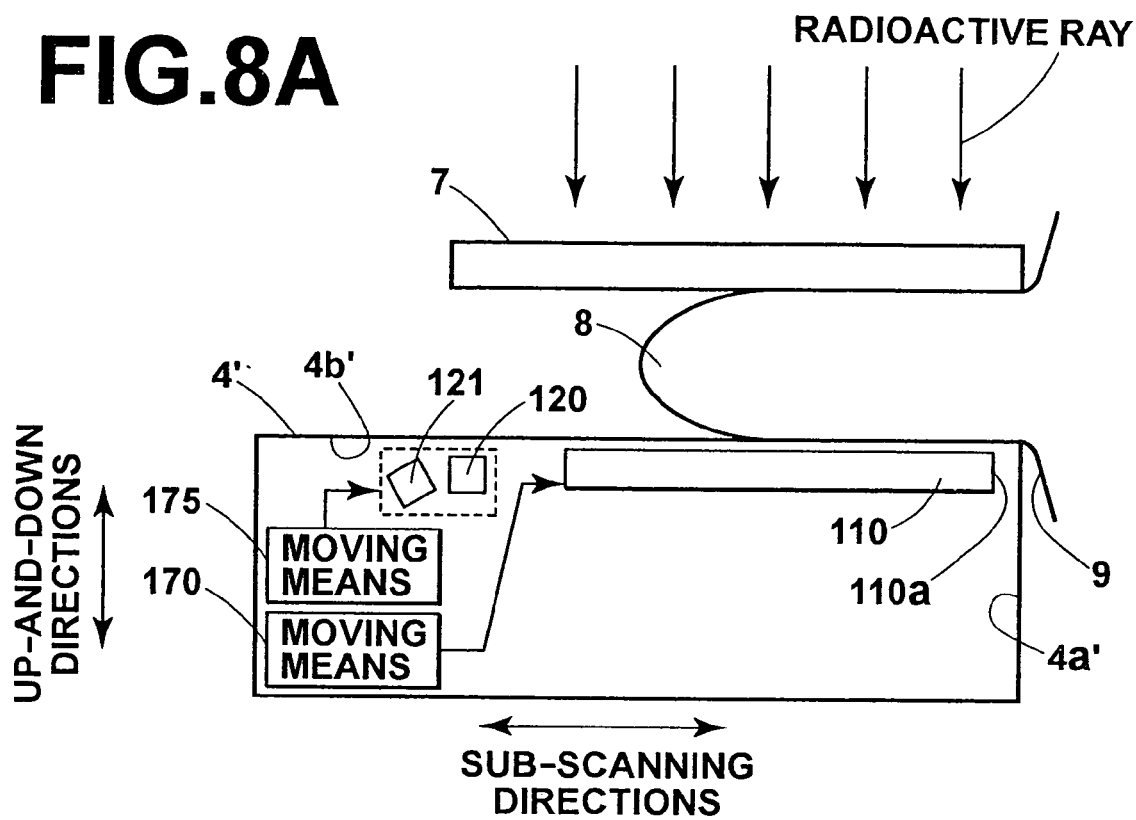
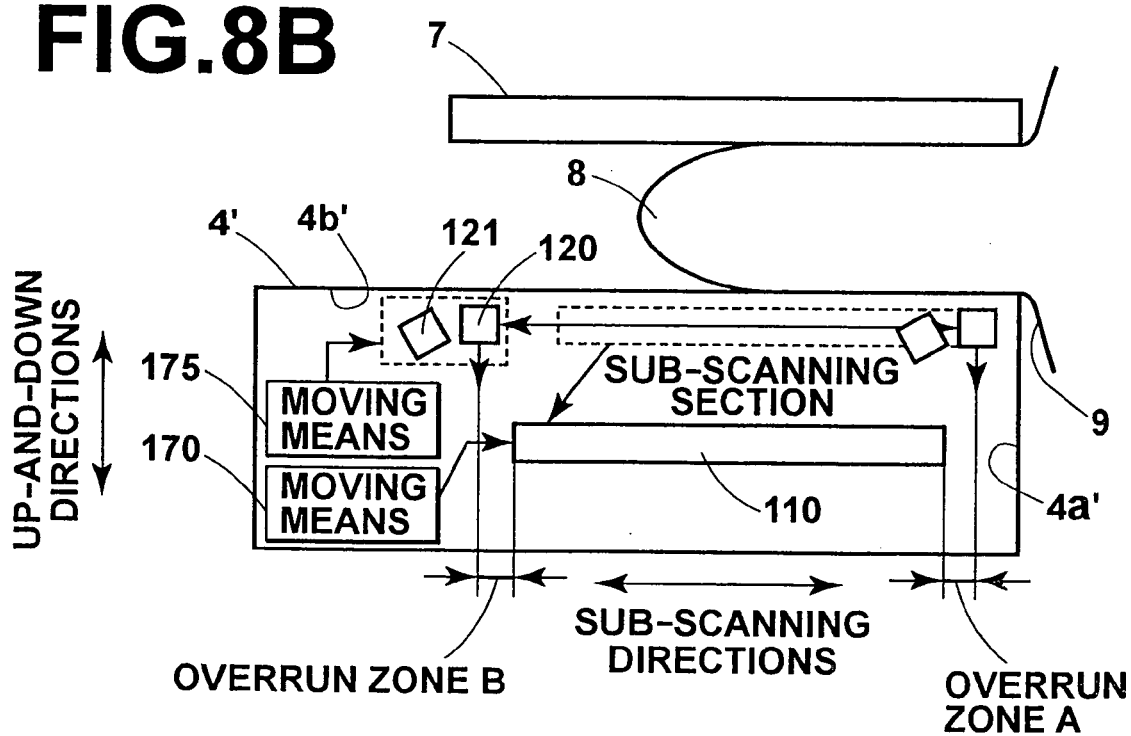

BREAST IMAGE OBTAINING METHOD AND APPARATUS

This is a divisional of application Ser. No. 10/665,150 filed Sep. 22, 2003, the entire disclosure of the prior application, application Ser. No. 10/665,150 is hereby incorporated by reference.

BACKGROUND OF THE INVENTION

1. Field of the Invention

The present invention relates to a breast image obtaining method and apparatus for obtaining a radiographic breast image using a solid-state detector, or stimulable phosphor panel.

2. Description of the Related Art

In medical X-ray and other radiography, a system for reading out radiographic image information using a solid-state detector has conventionally been known as described, for example, in U.S. Pat. No. 6,268,614 and Japanese Unexamined Patent Publication No. 2000-284056, etc. The system uses a photoconductor made of, for example, an a-Se (amorphous selenium) plate which is sensitive to radioactive rays, including X-rays, as a solid-state detector in order to reduce an amount of dosage exposed to a subject, and improve diagnostic capabilities, and reads out an electrostatic latent image, i.e., radiographic image information by irradiating recording radioactive rays (recording light), such as X-rays, carrying the radiographic image information on the solid-state detector to store the charges representing the latent image of the radiographic image information into the storage section of the solid-state detector, and thereafter scanning the solid-state detector with a reading electromagnetic wave(reading light), such as a laser beam, and detecting the current generated in the solid-state detector through flat or striped electrodes provided on both sides of the detector.

In medical X-ray and other radiography, a system for obtaining an image signal that carries radiographic image information using a stimulable phosphor panel is also known as described, for example, in U.S. Pat. No. 4,258,264 and Japanese Unexamined Patent Publication No. 56(1981)-011395, etc. The system uses a stimulable phosphor panel capable of storing some of the radiation energy irradiated thereon, and thereafter emitting stimulated luminescence in proportion to the amount of energy stored when irradiated with excitation light, such as visible light, and obtains an image signal carrying radiographic image information by first recording radiographic image information of a subject, such as a human body, on the stimulable phosphor panel, and thereafter scanning the panel with excitation light, such as a laser beam, to generate stimulated luminescence, which is photoelectrically read out by a sensor.

Currently, a breast image obtaining apparatus for obtaining a radiographic image of a breast using an imaging device, including the solid-state detector, stimulable phosphor panel, and the like described above has been contemplated.

The breast image obtaining apparatus described above obtains a radiographic image of a breast by holding the breast of the subject on a photography platform having a solid-state detector and reading light source, or a stimulable phosphor panel, excitation light source, and sensor inside the housing, and irradiating radioactive rays from above the breast. This type of apparatus is required to have the capability to obtain the breast image information up to the area of the breast as close to the chest wall of the subject as possible.

For this reason, in the breast image obtaining apparatus, the imaging device, such as the solid-state detector, or stimulable phosphor panel is placed as close to the chest wall of a subject as possible inside the housing of the photography platform, and the imaging is carried out with the platform being pressed to the chest wall of the subject.

In reading out radiographic image information from the imaging device described above, the scanning rate of the scanning section of the reading light source, or the excitation light source and sensor must be constant. Otherwise, the image information may not be read out correctly due to variations in the density of the pixel. For this reason, the image information on the areas of the imaging device corresponding to the acceleration and deceleration zones of the scanning section may not be read out correctly. In the breast image obtaining apparatus described above, virtually no space is available between the inner wall of the housing and the end of the imaging device on the side of the subject, so that the image information on the imaging device close to the chest wall of the subject may not be readout correctly due to varied scanning rate, when the imaging device is sub-scanned in the direction perpendicular to the direction along the chest wall of the subject using a linear light source that irradiates linear light in the direction along the main scanning direction.

In addition, the intensity of the irradiating light (reading or excitation light) irradiated on the imaging device must be uniform across the imaging device. In scanning the imaging device with the linear light source described above, a linear light source which is slightly longer that the width of the imaging device in the main scanning direction is normally used, since the intensity of the irradiating light of the linear light source is not uniform at its ends. In the breast image obtaining system described above, however, the linear light source may not be extended further than the end of the imaging device on the side of the chest wall, if the imaging device is sub-scanned in the direction parallel to the direction along the chest wall, resulting in a different amount of light being irradiated on the end of the imaging device on the side of the chest wall and the image information thereof may not be read out correctly.

SUMMARY OF THE INVENTION

In recognition of the circumstance described above, it is an object of the present invention to provide a breast image obtaining method and apparatus using a solid-state detector, or stimulable phosphor panel capable of correctly obtaining image information on the imaging device up to the area closer to the chest wall of a subject.

A first breast image obtaining method of the present invention is a breast image obtaining method for use with a solid-state detector accommodated in a housing, said detector being capable of recording image information carried by radioactive rays as an electrostatic latent image when irradiated with said rays, and generating an electric current in proportion to said electrostatic latent image when scanned with reading light, said method comprising the steps of: imaging a breast image of a subject by irradiating the radioactive rays passed through the breast on said solid-state detector; and reading out said breast image by mechanically scanning said detector with said reading light, and generating said electric current, wherein said imaging is performed after said detector is moved inside the housing to a place close to the chest wall of the subject, and said reading is performed after said detector is moved inside the housing to a place remote from the chest wall of the subject.

In the first breast image obtaining method described above, the term "solid-state detector" may be any type of detector, for example, the electrophotographic recording medium described in U.S. Pat. No. 6,268,614, if it is capable of recording image information carried by the recording light, such as light or radioactive rays, as an electrostatic latent image when irradiated with the light, and generating an electric current in proportion to the electrostatic latent image.

A second breast image obtaining method of the present invention is a breast image obtaining method for use with a stimulable phosphor panel accommodated in a housing, said panel being capable of storing image information carried by radioactive rays when irradiated with said rays, and generating stimulated luminescence in proportion to said image information when scanned with excitation light, said method comprising the steps of: imaging a breast image of a subject by irradiating the radioactive rays passed through the breast on said stimulable phosphor panel; and reading out said breast image by mechanically scanning said panel with said excitation light, and detecting stimulated luminescence generated by said scanning, wherein said imaging is performed after said panel is moved inside the housing to a place close to the chest wall of the subject, and said reading is performed after said panel is moved inside the housing to a place remote from the chest wall of the subject.

In the first and second breast image obtaining methods described above, the term "mechanically scanning" means to scan the imaging device, such as the solid-sate detector, or stimulable phosphor panel with irradiating light (reading or excitation light) irradiated on a part of the imaging device by moving the light source relative to the imaging device.

A first breast image obtaining apparatus of the present invention is an apparatus for implementing the first breast image obtaining method described above, and comprises: a solid-state detector capable of recording image information carried by radioactive rays as an electrostatic latent image when irradiated with said rays, and generating an electric current in proportion to said electrostatic latent image when scanned with reading light; a reading light scanning means for mechanically scanning said detector with said reading light; a housing for accommodating said detector, and reading light scanning means; and a moving means for moving said detector inside the housing in the directions toward and away from the chest wall of a subject, wherein said apparatus is configured to pick up a breast image by irradiating radioactive rays passed through the breast on said detector at a place close to the chest wall of a subject, and read out said breast image by mechanically scanning said detector with said reading light scanning means, and generating said electric current at a place remote from the chest wall of the subject.

A second breast image obtaining apparatus of the present invention is an apparatus for implementing the second breast image obtaining method described above, and comprises: a stimulable phosphor panel capable of storing image information carried by radioactive rays when irradiated with said rays, and generating stimulated luminescence in proportion to said image information when scanned with excitation light; an excitation light scanning means for mechanically scanning said panel with said excitation light; a sensor for detecting said stimulated luminescence; a housing for accommodating said panel, excitation light scanning means, and sensor; and a moving means for moving said panel inside the housing in the directions toward and away from the chest wall of a subject, wherein said apparatus is configured to pick up a breast image by irradiating radioactive rays passed through the breast on said panel at a place close to the chest wall of the subject, and read out said breast image by mechanically scanning said panel with said excitation light scanning means, and detecting said stimulated luminescence generated by said scanning at a place remote from the chest wall of the subject.

In the breast image obtaining method and apparatus according to the present invention, the imaging device (solid-state detector, or stimulable phosphor panel) is moved inside the housing of the photography platform to a place close to the chest wall of the subject at the time of imaging to obtain a breast image up to the area in the vicinity of the chest wall, and to a place remote from the chest wall at the time of reading to provide a space between the inner wall of the housing and the end section of the imaging device on the side of the subject, so that, for example, when the imaging device is sub-scanned in the direction perpendicular to the direction along the chest wall of a subject using the linear light source that irradiates linear light in the direction along the main scanning direction, the acceleration or deceleration of the scanning section of the reading light source, or the excitation light source and sensor may be completed within the space, and the scanning rate of the scanning section may be maintained constant across the entire region of the imaging device, or when the imaging device is sub-scanned in the direction parallel to the direction along the chest wall, the length of the linear light may be extended further by the distance of the space than the end of the imaging device on the side of the chest wall to provide a scanning light with uniform intensity to the end of the imaging device on the side of the chest wall. This allows the image information to be obtained correctly from the entire region of the imaging device, which means that the image information on the area of the imaging device closer to the chest wall may be obtained correctly.

BRIEF DESCRIPTION OF THE DRAWINGS

FIG. 8A is a drawing illustrating the location of a stimulable phosphor panel inside a photography platform (housing) at the time of recording.

FIG. 8B is a drawing illustrating the location of a stimulable phosphor panel inside a photography platform (housing) at the time of reading.

DESCRIPTION OF THE PREFERRED EMBODIMENTS

Figure 1:
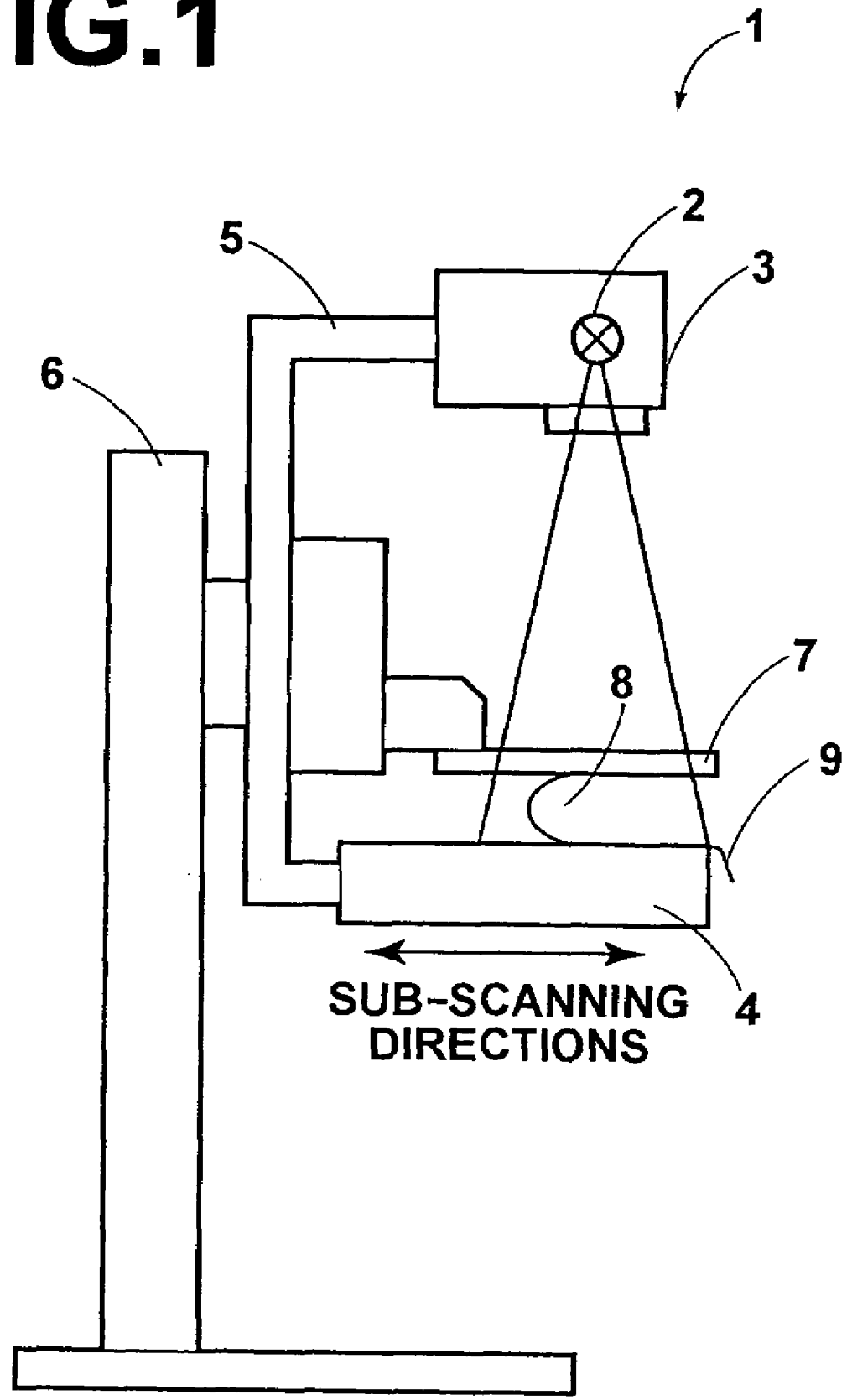
FIG. 1 is a schematic diagram of a breast image obtaining apparatus according to a first embodiment of the present invention.
Figure 2:
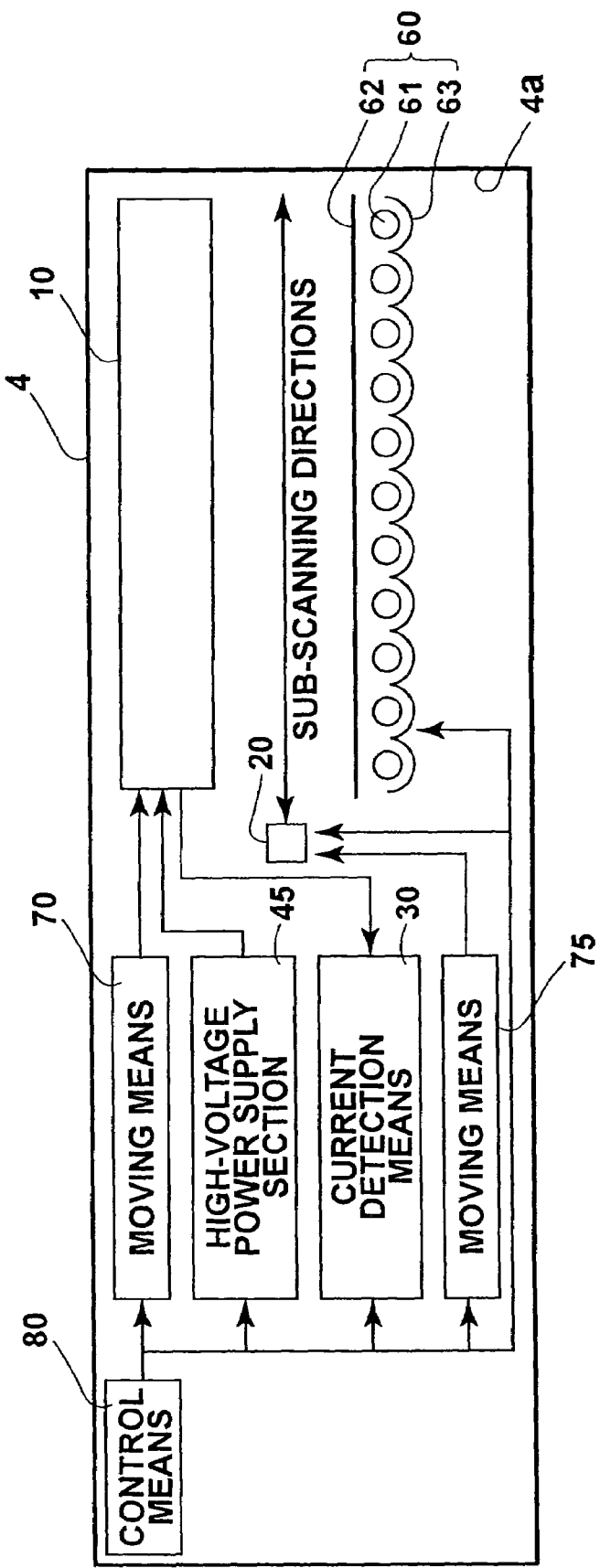
FIG. 2 a schematic diagram of a photography platform of the breast image obtaining apparatus shown in FIG. 1, illustrating the inside thereof.
Figure 3:
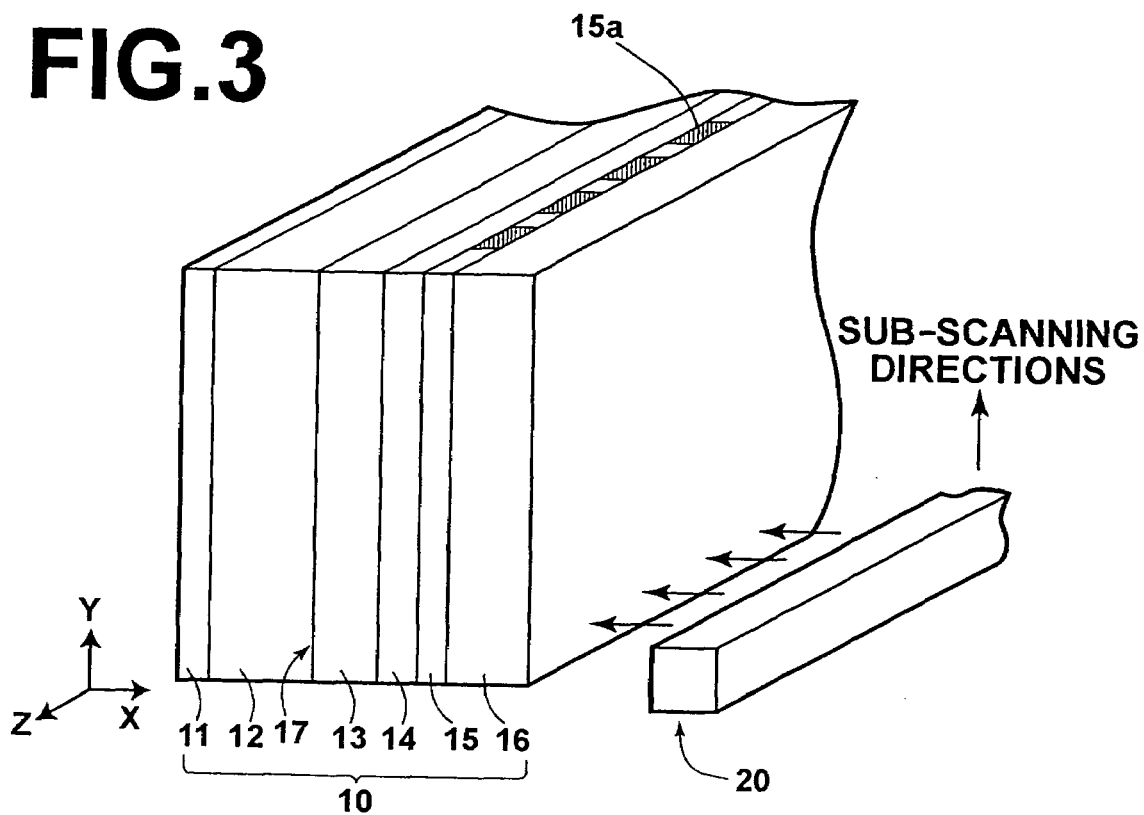
FIG. 3 is a schematic diagram of a solid-state detector used in the breast image obtaining apparatus shown in FIG. 1.

Hereinafter, the preferred embodiments of the present invention will be described in detail with reference to the accompanying drawings. FIG. 1 is a schematic diagram of a breast image obtaining apparatus according to a first embodiment of the present invention. FIG. 2 is a schematic diagram of a photography platform of the apparatus shown in FIG. 1, illustrating the inside thereof, and FIG. 3 is a schematic diagram of a solid-state detector used in the apparatus shown in FIG. 1.

The breast image obtaining apparatus 1 shown in FIG. 1 comprises a radiation source accommodation section 3 having a radiation source 2 therein; a photography platform comprising a housing 4 having a solid-state detector 10 and others therein; an arm 5 for connecting the radiation source accommodation section 3 and the photography platform in face to face; and a base 6 for fixing the arm 5. Further, the arm 5 has a holding plate 7 for holding down a breast 8 onto the housing 4 from above.

Inside the housing 4, the solid-state detector 10, which is an imaging device; a reading light exposure section 20; a reading light exposure section moving means 75 for moving the reading light exposure section 20 in the directions along the sub-scanning directions; an electric current detection means 30 for detecting an electric current flowing out from the solid-state detector 10 when scanned with the reading light exposure section 20 to obtain an image signal; a high-voltage power supply section 45 for applying a given voltage to the solid-state detector 10; a pre-exposure light source section 60 for irradiating pre-exposure light on the solid-sate detector 10 prior to imaging; a solid-state detector moving means 70 for moving the solid-state detector inside the photography platform (housing) 4 in the directions toward and away from the chest wall 9 of a subject (i.e., sub-scanning directions described above); and a control means 80 for controlling the reading light exposure section 20, electric current detection means 30, high-voltage power supply section 45, pre-exposure light source section 60, and moving means 70 and 75 are provided.

The solid-state detector records radiographic image information as an electrostatic latent image, and generates an electric current in proportion to the electrostatic latent image when scanned with reading light. More specifically, it is formed on a glass substrate 16, and comprises a first electroconductive layer 11 having transparency to radioactive rays passed through the breast 8 (hereinafter referred to as "recording light"), a recording photoconductive layer 12 that takes on electric conductivity by generating electric charges when exposed to the recording light, a charge transport layer 13 that serves as substantially an insulator against the charge having the same polarity as that of the charges representing the latent image charged on the first electroconductive layer, and as substantially an electrical conductor for charges having the transport polarity, which is the reverse polarity of the charges representing the latent image, a reading photoconductive layer 14 that takes on electric conductivity by generating electric charges when exposed to the reading light, and a second electroconductive layer 15 having transparency to the reading light, layered in this order as illustrated in FIG. 3. A storage section 17 is formed at the interface between the recording photoconductive layer 12 and the charge transport layer 13.

Each of the first electroconductive layers 11, and second electroconductive layer 15 serves as an electrode. The electrode of the first electroconductive layer 11 is a two-dimensional flat electrode, and the electrode of the second electroconductive layer 15 is a striped electrode composed of a number of elements 15a (wire electrodes) disposed in stripes at the pitch of the pixel as shown in hatched lines in the FIG. 3 as described, for example, in U.S. Pat. No. 6,268,614 (electrophotographic recording medium). The arranging direction of the elements 15a corresponds to the main scanning direction, and the longitudinal direction of the elements 15a corresponds to the sub-scanning direction.

The reading light exposure section 20 comprises a linear light source composed of a plurality of LED chips disposed in a line, and an optical system for irradiating the light emitted from the linear light source on the solid-state detector as linear light. The solid-state detector 10 is entirely exposed by scanning over the solid-state detector 10 with the reading light exposure section 20, with a necessary distance therebetween being maintained, by the moving means 75 having a linear motor, in the longitudinal direction of the striped electrodes 15a of the solid-state detector 10, i.e., the sub-scanning direction. The reading light scanning means is formed by the reading light exposure section 20 and moving means 75.

Figure 4:
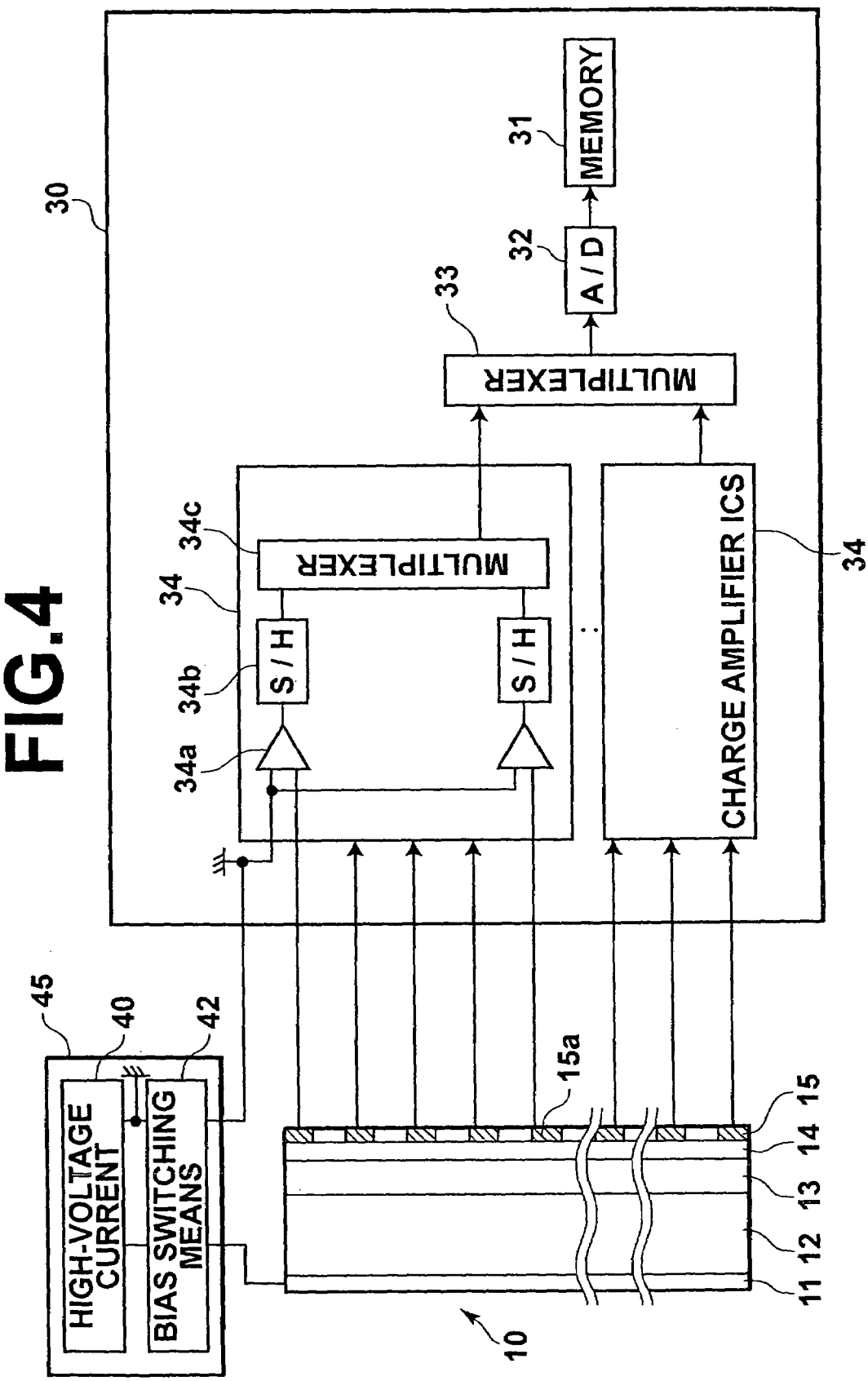
FIG. 4 is a block diagram illustrating the details of a current detection means, and high-voltage power supply section used in the breast image obtaining apparatus shown in FIG. 1, and connections between these devices and a solid-state detector.

FIG. 4 is a block diagram illustrating the details of the current detection means 30 and high-voltage power supply section 45, and connections between these devices and the solid-state detector 10 provide inside of the housing 4 of the photography platform.

The high-voltage power supply section 45 is a circuit comprising a high-voltage power supply 40 and bias switching means 42, integrated together. The high-voltage power supply is connected to the solid-state detector through the bias switching means 42 for biasing/short-circuiting the solid-state detector. The circuit described above is designed to prevent overcurrents caused by the electric charging and discharging by limiting the peak current that flows at the time of switching the bias, in order to protect the portion of the apparatus where a large amount of electric current flows.

The electric current detection means 30 comprises a memory 31; A/D conversion section 32; multiplexer 33; and charge amplifying IC 34. In the first preferred embodiment of the present invention, several to dozens of charge amplifying ICs 34 are provided in total, and a group of adjoining several elements 15a is connected to each of the charge amplifying ICs 34, instead of connecting all of the elements 15a to a single charge amplifying IC 34.

Each of the charge amplifying ICs 34 has a number of charge amplifiers 34a and sample-and-hold (S/H) circuits 34b, each being connected to each of the elements 15a of the solid-state detector 10; and a multiplexer 34c for multiplexing the signal from each of the sample-and-hold circuits 34b. The electric current flowing out from the solid-state detector is converted to a voltage signal by each of the charge amplifiers 34a, which is then sampled at a given timing and held by each of the sample-and-hold circuits. Then, each of the voltage signals corresponding to each of the elements 15a held by each of the sample-and-hold circuits is sequentially outputted from the multiplexer 34c in the order in which corresponding elements 15a are arranged (which corresponds to a part of the main scanning). The signal sequentially outputted from the multiplexer 34c is inputted to the multiplexer 33, which sequentially outputs the inputted signals in the order in which the corresponding elements 15a are arranged to complete the main scanning. The signal sequentially outputted from the multiplexer 33 is converted to a digital signal through the A/D conversion section 32, which is stored into the memory 31.

The pre-exposure light source section 60 requires a light source that will quickly start emitting/quenching light with an extremely small optical afterglow. In the first preferred embodiment of the present invention, a rare gas fluorescent lamp with external electrodes is used. More specifically, as shown in FIG. 2, the pre-exposure light source section 60 comprises a plurality of rare gas fluorescent lamps with external electrodes 61 extending backward from the surface of the FIG. 2; a wavelength selection filter 62 inserted between the fluorescent lamps 61 and the solid-state detector 10; and a light reflector 63 placed on the back of the fluorescent lamps to effectively reflect the light emitted from the fluorescent lamps 61 onto the solid-state detector 10. The pre-exposure light is required to be irradiated over the second electrode layer 15 of the solid-state detector 10 only, and any special light converging means is not required. However, a narrower luminance distribution is preferable. As for the light source, for example, LED chips disposed in a two-dimensional plane may be used instead of the fluorescent lamps.

In reading out an electrostatic latent image from the solid-state detector, all of the charges representing the latent image may be read out in principle. But, in some cases, not all of the latent image may be read out completely, and some of them remain in the solid-state detector 10 as residual charges. In addition, in recording an electrostatic latent image on the solid-state detector 10, a high voltage is applied to the solid-state detector 10 prior to the irradiation of the recording light, which may generate a dark current, thereby the charges due to the dark current (dark current charges) are also stored in the solid-state detector 10. Further, it has been known that various kinds of charges arising from causes other that those described above are stored in the solid-state detector prior to the irradiation of the recording light. These unwanted charges, including the residual and dark current charges stored in the solid-state detector 10 prior to the irradiation of the recording light will be added to the charges that carry the image information stored in the solid-state detector 10 by the irradiation of the recording light, thus the output signal will contain in effect the unwanted signal component due to the unwanted charges other than that based on the charges that carry the image information when the electrostatic latent image is read out from the solid-state detector 10, causing problems, such as image lags, and degraded signal-to-noise ratios.

The purpose of the pre-exposure is to eliminate these problems, including the image lag and degraded signal-to-noise ratio by erasing the unwanted charges stored in the solid-state detector prior to the irradiation of the recording light.

The moving means comprises a linear motor, which is not shown, to reciprocate the solid-state detector 10 between the imaging and reading locations. Here, the imaging location means a location of the solid-state detector in the housing 4 moved toward a place in the vicinity of the inner side wall 4a of the housing on the side of the chest wall 9 of the subject (the place where the solid-state detector is located in FIG. 5A), and the reading location means a location of the solid-state detector in the housing 4 moved away from the inner side wall 4a of the housing on the side of the chest wall 9 of the subject (the place where the solid-state detector is located in FIG. 5B).

Hereinafter, the operation of the breast image obtaining apparatus 1 configured in the aforementioned manner will be described.

Figure 5A:
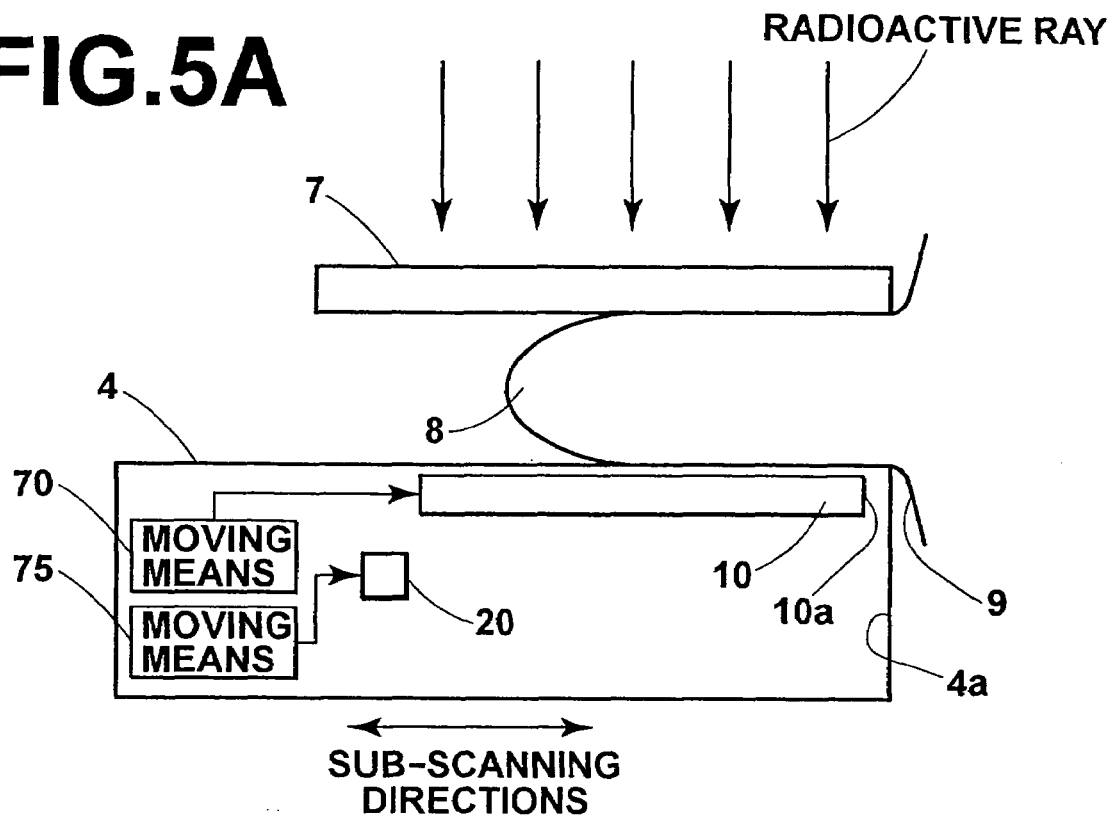
FIG. 5A is a drawing illustrating the location of a solid-state detector inside a photography platform (housing) at the time of recording.
Figure 5B:
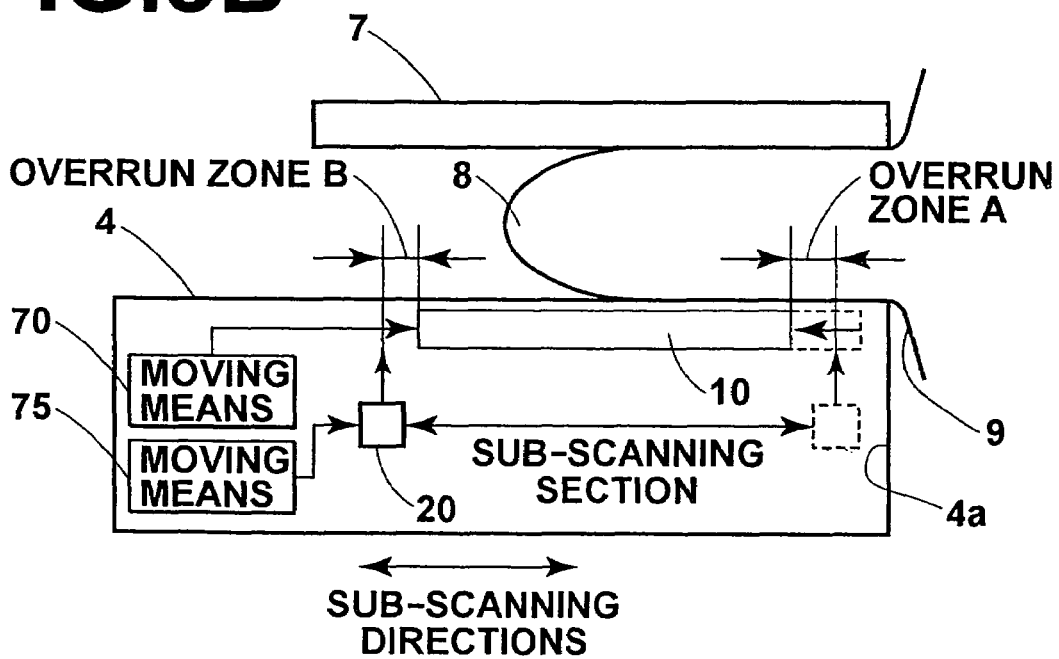
FIG. 5B is a drawing illustrating the location of a solid-state detector inside a photography platform (housing) at the time of reading.

FIGS. 5A and 5B are the drawings illustrating the locations of the solid-state detector in the housing 4 at the time of imaging and reading respectively.

As shown in FIG. 5A, at the time of imaging, the solid-state detector 10 has been moved to the imaging location by the moving means 70 in advance, and pre-exposure light is irradiated on the solid-state detector 10 to erase the unwanted charges stored therein. The pre-exposure process may be implemented before or after the application of a voltage to the solid-state detector. Further, the pre-exposure mode may be such that the pre-exposure light is switched on prior to the application of a voltage, and switched off after the voltage is applied.

Then, the negative pole of the power supply 40 is connected to the first electroconductive layer 11 by means of the bias switching means 42 to apply a DC voltage between the first electroconductive layer 11 and each of the elements 15a, charging both of the electroconductive layers 11 and 15. By doing so, an U-shaped electric field is formed between the first electroconductive layer 11 and each of the elements 15a of the solid-state detector 10 with the element 15a being the bottom of the field.

Thereafter, when an imaging staff presses down an irradiation button, which is not shown, taking the timing of imaging, radioactive rays are irradiated from the radiation source 2 onto the breast 8. When the radioactive rays passed through the breast 8, i.e., the recording light carrying the radiographic image of the breast 8 is irradiated on the solid-state detector 10, positive/negative charge pairs are produced in the recording photoconductive layer 12 of the solid-state detector 10. The negative charges of the pairs are drawn toward each of the elements 15a along the distribution of the electric field described above and stored in the storage section 17 formed at the interface between the recording photoconductive layer 12 and the charge transport layer 13. The amount of negative charges stored in the storage section 17, i.e., the charges representing the latent image is substantially proportional to the amount of radioactive rays passed through the subject, so that the electrostatic latent image is now carried by the charges representing the latent image. Thus, the electrostatic latent image is recorded on the solid-state detector 10. Meanwhile, the positive charges produced in the recording photoconductive layer 12 are drawn to the first electroconductive layer 11 and re-coupled with the negative charges injected from the high-voltage power supply 40, and disappear.

In reading out the electrostatic latent image from the solid-state detector 10, after recording the image by the irradiation of the radioactive rays, the solid-state detector 10 is moved to the reading location by the moving means 70, as shown in FIG. 5B, and the two electroconductive layers 11 and 15 of the solid-state detector 10 are short-circuited by the bias switching means 42.

The reading light exposure section 20 is activated to output reading light, and the entire surface of the solid-state detector 10 is scanned with the reading light by moving the reading light exposure section 20 in the longitudinal direction of the element 15a, i.e., the sub-scanning direction by the moving means 75.

At this time, the solid-state detector 10 has been moved in the housing to the reading location, i.e., a place remote from the chest wall 9 of the subject, so that an overrun zone A for the reading light exposure section 20 is secured between the inner surface of the side wall 4a of the housing and the end 10a of the solid-state detector on the side of the subject. By completing the acceleration or deceleration of the reading light exposure section 20 within in this zone, the scanning rate of the reading light exposure section 20 may be maintained constant across the entire surface of the solid-state detector 10, thereby correct image information may be obtained from the entire region of the solid-state detector 10.

When the aforementioned scanning is performed, positive/negative charge pairs are produced in the reading photoconductive layer 14, and the positive charges of the pairs move quickly through the charge transport layer 13 by the attraction of the negative charges (charges representing the latent image) stored on the storage section 17, and are re-coupled with the charges representing the latent image, and dissolved away at the storage section 17. Meanwhile, the negative charges produced in the reading photoconductive layer 14 are re-coupled with the positive charges injected into the second electroconductive layer 15, and disappear. In this way, the negative charges stored in the solid-state detector 10 are dissolved by the charge re-coupling, and an electric current is generated in the solid-state detector 10 by the movement of the charges in the charge re-coupling.

These electric currents generated in the solid-state detector are detected in parallel (simultaneously) by each of the current detection charge amplifiers 34a connected to each of the elements 15a. Each of the signal detected by each of the charge amplifiers 34a is sampled and held by each of the sample-and-hold circuits 34b. Each of the signal voltage corresponding to each of the elements 15a sampled and held by each of the sample-and-hold circuits is outputted sequentially from the multiplexer 34c in the order in which the corresponding elements 15a are arranged, which is then outputted sequentially from the multiplexer 33 in the order in which the corresponding elements 15a are arranged. The signal outputted from the multiplexer 33 is converted to a digital signal through the A/D conversion section 32, and stored into the memory 31 as a digital image signal.

The amount of electric current flowing through the solid-state detector 10 generated by the scanning of the reading light over the solid-state detector 10 is proportional to the amount of charges representing the latent image or electrostatic latent image, so that the signal obtained by detecting the electric current represents the electrostatic latent image, thereby the electrostatic latent image may be read out.

In the first preferred embodiment of the present invention described above, an electrophotographic recording medium described in U.S. Pat. No. 6,268,614 is used as the solid-state detector, but the solid-state detector of the present invention is not limited to the electrophotographic recording medium. More specifically, any kind of solid-state detector may be used as the solid-state detector of the present invention, if it is capable of generating an electric current in proportion to the electrostatic charges carrying image information when scanned with a reading electromagnetic wave.

Figure 6:
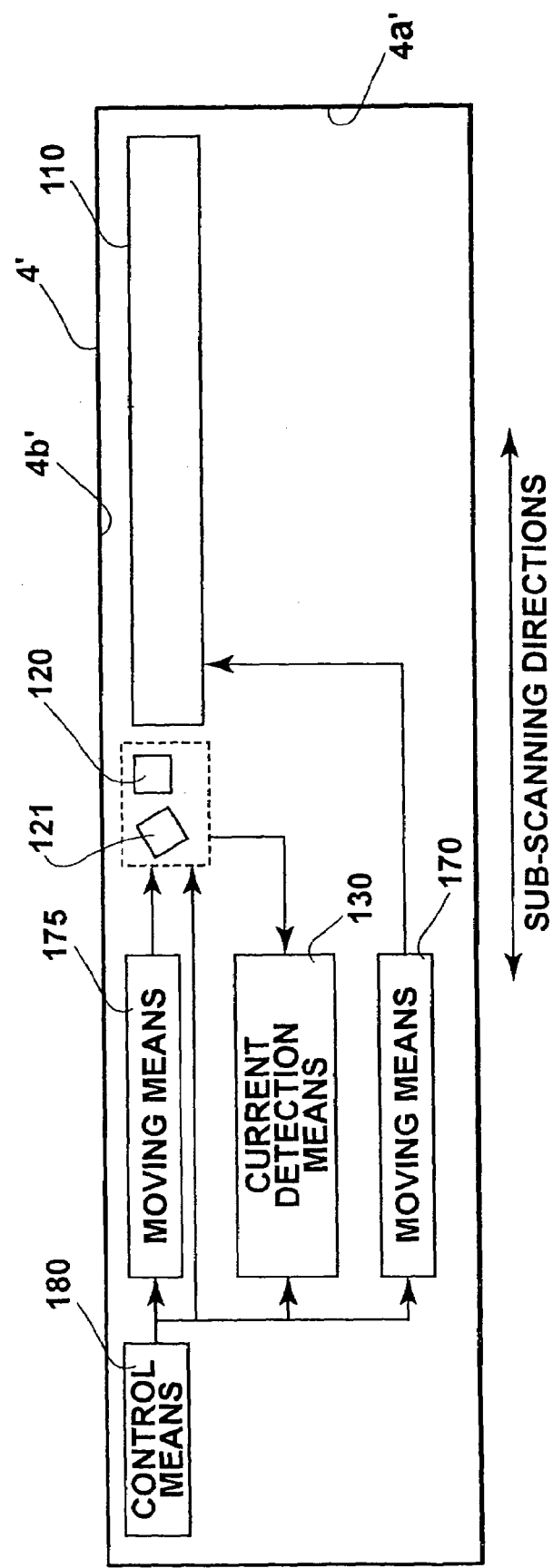
FIG. 6 is a schematic diagram of a photography platform of a breast image obtaining apparatus according to a second embodiment of the present invention, illustrating the inside thereof.
Figure 7:
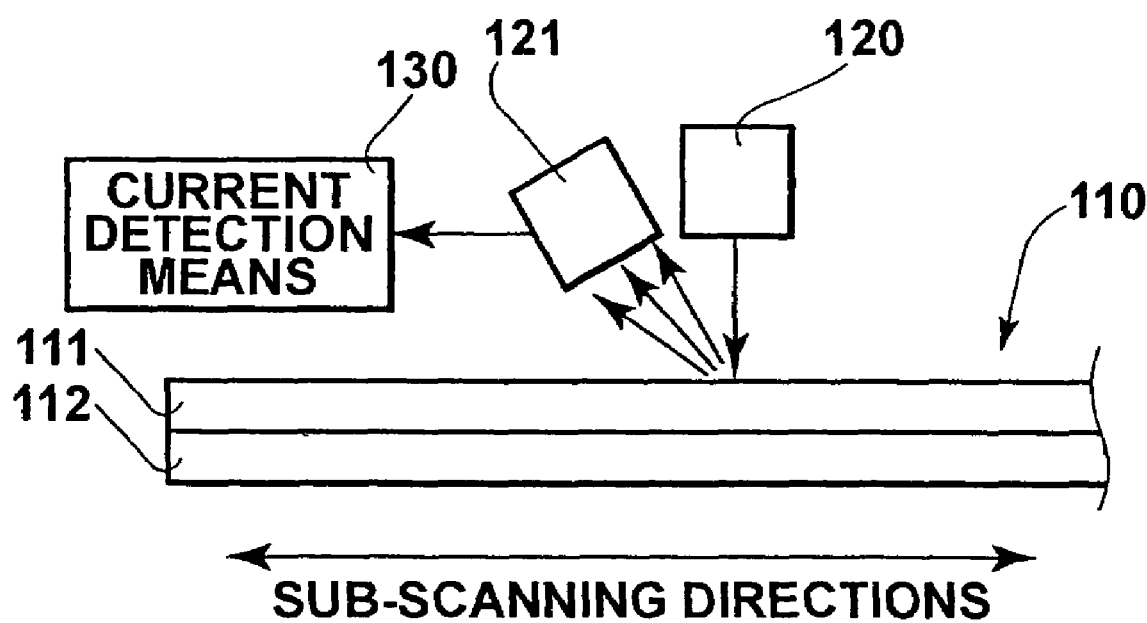
FIG. 7 is a schematic diagram of a stimulable phosphor panel used in the breast image obtaining apparatus shown in FIG. 6.

Hereinafter, a breast image obtaining apparatus according to a second embodiment of the present invention will be described. The apparatus of the second embodiment is an apparatus that uses a different type of imaging device and a part of the configuration is changed accordingly when compared with the apparatus according to the first embodiment. FIG. 6 is a schematic diagram of the photography platform of the breast image obtaining apparatus according to the second embodiment of the present invention, illustrating the inside thereof, and FIG. 7 is a schematic diagram of a stimulable phosphor panel used in the breast image obtaining apparatus shown in FIG. 6.

Inside the housing 4' that comprises the photography platform of the apparatus according to the second embodiment of the present invention, a stimulable phosphor panel 110, which is an imaging device; an excitation light source section 120 for use in reading radiographic image information recorded on the stimulable phosphor panel 110; a line sensor 121 for detecting stimulated luminescence emitted from the stimulable phosphor panel when scanned with the excitation light source section 120; an electric current detection means 130 for detecting an electric current outputted from the line sensor 121 to obtain an image signal; a panel moving means 170 for moving the stimulable phosphor panel 110 inside the housing 4' in the directions toward and away from the chest wall of a subject (sub-scanning direction described later); a reading section moving means 175 for moving the excitation light source section 120 and line sensor 121 in the sub-scanning direction; and a control means 180 for controlling the excitation light source section 120, line sensor 121, electric current detection means 130, and moving means 170 and 175 are provided.

The storage phosphor panel 110 is composed of a storage phosphor layer 111 that will emit an amount of stimulated luminescence in proportion to the radiation energy stored therein when irradiated with excitation light, and a base (substrate) 112 on which the storage phosphor layer 111 is laminated.

The storage phosphor layer 111 may be stimulated, for example, by red excitation light having a wavelength of not less than 600 nm, and emit blue stimulated luminescence having a wavelength not greater than 500 nm (preferably, in the range from 400 nm to 450 nm), and hence any known storage phosphor sheet may be used as the storage phosphor layer 111. Although not shown in FIG. 7, the storage phosphor panel has, for example, a protection layer, sensitizing layer, and the like, in addition to the storage phosphor layer 111.

As for the excitation light source section 120, an excitation light source section comprising a linear light source having a plurality of LED chips that will emit red light having a wavelength of not smaller than 600 nm, disposed in a line; and an optical system for irradiating the light emitted from the linear light source over the storage phosphor panel 110 as linear light is used.

The line sensor 121 is a one-dimensional sensor disposed in substantially parallel to the longitudinal direction of the excitation light source section 120, and, for example, a line sensor described in Japanese Unexamined Patent Publication No. 2001-245100 may be used as the line sensor 121. The line sensor 121 has an excitation light cut filter, which is not shown, to detect only the stimulated luminescence generated by the irradiation of the excitation light.

The storage phosphor panel 110 is entirely exposed by scanning over the storage phosphor panel 110 with the excitation light source section 120 and line sensor 121, with a necessary distance therebetween being maintained, by the moving means 175 having a linear motor, in the direction perpendicular to the longitudinal direction of the light source section 120 (sub-scanning direction). The excitation light scanning means is formed by the excitation light source section 120 and linear motor.

The moving means 170 comprises a linear motor, and reciprocates the storage phosphor panel 110 between the imaging location, which is a place in the vicinity of the chest wall 9 of the subject, and the reading location, which is a place remote from the chest wall of the subject.

In order to effectively detect the stimulated luminescence from the stimulable phosphor panel 110, it is preferable to irradiate the excitation light on the incident surface of the radioactive rays, and to detect the stimulated luminescence generated on the same surface. In order to provide such mode of operation, a space for scanning the excitation light source section 120 and line sensor 121 must be secured at the time of reading between the inner surface of the upper wall 4b' of the housing 4' (the wall on the incident side of the radioactive rays) and stimulable phosphor panel 110. In order to increase the sharpness of the radiographic image, however, it is preferable to place the stimulable phosphor panel 110 as close to the inner surface of the upper wall 4b' of the housing 4' as possible to shorten the distance between the breast 8 and the stimulable phosphor panel 110 at the time of recording.

Accordingly, the imaging location in the second embodiment of the present invention means a location of the stimulable phosphor panel 110 at a place within the housing 4' in the vicinity of the inner surface of the side wall 4a' on the side of the chest wall 9 of the subject, and of the inner surface of the upper wall 4b' of the housing (the place where the stimulable phosphor panel 110 is located in FIG. 8A), and the reading location means a location of the stimulable phosphor panel at a place within the housing 4' away from the inner surface of the side wall 4a' on the side of chest wall 9 of the subject, and from the inner surface of the upper wall 4b' of the housing (the place where the stimulable phosphor panel 110 is located in FIG. 8B). Consequently, the panel moving means 170 is configured to move the stimulable phosphor panel 110 within the housing 4' in the sub-scanning directions, and up-and-down directions as illustrated in FIGS. 8A and 8B.

Hereinafter, the operation of the breast image obtaining apparatus 1 configured in the aforementioned manner will be described.

FIGS. 8A and 8B are the drawings illustrating the locations of the stimulable phosphor panel within the housing at the time of imaging and reading respectively.

As shown in FIG. 8A, at the time of imaging, the stimulable phosphor has been moved to the imaging location by the moving means 170 in advance. Thereafter, when an imaging staff presses down an irradiation button, which is not shown, taking the timing of imaging, radioactive rays are irradiated from the radiation source 2 onto the breast 8. The radioactive rays passed through the breast 8, i.e., the radioactive rays carrying the radiographic image of the breast 8 are stored into the stimulable phosphor panel 110.

In reading out the image information from the stimulable phosphor panel 110, after recording the image by the irradiation of the radioactive rays, the stimulable phosphor panel 110 is moved to the reading location by the moving means 170, as shown in FIG. 8B.

The excitation light source section 120 is activated to output excitation light, and the entire surface of the stimulable phosphor panel is scanned with the excitation light by moving the excitation light source section 120 and line sensor 121 in the sub-scanning direction of the stimulable phosphor panel by the moving means 175.

At this time, the stimulable phosphor panel has been moved in the housing to the reading location, i.e., a place remote from the inner surface of the side wall 4a' on the side of the chest wall 9 of the subject, and from the inner surface of the upper wall 4b' of the housing, so that it is possible to scan the upper surface of the stimulable phosphor panel 110, i.e., the incident surface of the radioactive rays with the excitation light source section 120 and line sensor 121. In addition, an overrun zone for the excitation light source section 120 and line sensor 121 is secured between the inner surface of the side wall 4a' of the housing on the side of the subject and the end 110a of the stimulable phosphor panel 110 on the side of the subject, so that the scanning rate of the excitation light source section 120 and line sensor 121 may be maintained constant across the entire surface of the stimulable phosphor panel 110 by completing acceleration or deceleration of the excitation light source section 120 and line sensor 121 within this zone, thereby the image information may be obtained correctly from the entire region of the stimulable phosphor panel.

So far, the preferred embodiments of the present invention have been described, in which a breast image obtaining apparatus that comprises a radiation source and photography platform configured as a unit is introduced, but the present invention may also be applied to the cassette used for picking up a breast image.

Further, the mode of moving the imaging device is not limited to those described in the first and second embodiments. It may be any mode if it is capable of providing a space inside the housing at the time of reading between the inner surface of the side wall and the end of the imaging device on the side of the subject.

What is claimed is:

1. A breast image obtaining method for use with a stimulable phosphor panel accommodated in a housing, said panel being capable of storing image information carried by radioactive rays when irradiated with said rays, and generating stimulated luminescence in proportion to said image information when scanned with excitation light, said method comprising the steps of:

imaging a breast image of a subject by irradiating the radioactive rays passed through the breast on said stimulable phosphor panel; and reading out said breast image by mechanically scanning said panel with said excitation light, and detecting stimulated luminescence generated by said scanning;

wherein said imaging is performed after said panel is moved inside the housing to a place close to the chest wall of the subject, and said reading is performed after said panel is moved inside the housing to a place remote from the chest wall of the subject;

wherein said read out is performed after said panel is moved inside the housing to a place remote from the chest wall of the subject such that said excitation light scans past an end of said panel that is closer to the chest wall of the subject as defined in the breast image.

2. The method of claim 1, wherein said excitation light is a linear light irradiated towards said panel to perform said scanning.

3. The method of claim 1, wherein said reading out is performed uniformly throughout said panel.

4. A breast image obtaining apparatus comprising:

a stimulable phosphor panel capable of storing image information carried by radioactive rays when irradiated with said rays, and generating stimulated luminescence in proportion to said image information when scanned with excitation light;

an excitation light scanning means for mechanically scanning said panel with said excitation light;

a sensor for detecting said stimulated luminescence;

a housing for accommodating said panel, excitation light scanning means, and sensor; and a moving means for moving said panel inside the housing in the directions toward and away from the chest wall of a subject;

wherein said apparatus is configured to pick up a breast image by irradiating radioactive rays passed through the breast on said panel at a place close to the chest wall of the subject, and said breast image is read out by mechanically scanning said panel with said excitation light scanning means, and said stimulated luminescence generated by said scanning is detected at a place remote from the chest wall of the subject;

wherein said apparatus is configured to read out said panel by moving said panel to a place remote from the chest wall of the subject such that said excitation light scans past an end of said panel that is closer to the chest wall of the subject as defined in the breast image.

5. The apparatus of claim 4, wherein said excitation light is generated by a linear light source that irradiates linear light towards said panel to perform said scanning.

6. The apparatus of claim 4, wherein said reading out is performed uniformly throughout said panel.

7. A breast image obtaining apparatus comprising:

a stimulable phosphor panel capable of storing image information carried by radioactive rays when irradiated with said rays, and generating stimulated luminescence in proportion to said image information when scanned with excitation light;

an excitation light scanning means for mechanically scanning said panel with said excitation light;

a sensor for detecting said stimulated luminescence;

a housing for accommodating said panel, excitation light scanning means, and sensor; and a moving means for moving said panel inside the housing in the directions toward and away from the chest wall of a subject, wherein said apparatus is configured to pick up a breast image by irradiating radioactive rays passed through the breast on said panel at a place close to the chest wall of the subject, and said breast image is read out by mechanically scanning said panel with said excitation light scanning means, and said stimulated luminescence generated by said scanning is detected at a place remote from the chest wall of the subject at a location as defined by the inner wall of the housing closest to the chest wall of the subject such that said reading out is performed uniformly throughout said panel;

wherein said apparatus is configured to read out said panel by moving said panel to a place remote from the chest wall of the subject such that said excitation light scans past an end of said panel that is closer to the chest wall of the subject as defined in the breast image.

8. The apparatus of claim 7, wherein said excitation light is generated by a linear light source that irradiates linear light towards said panel to perform said scanning.

* * * * *